W. E. DATE.
OVERLOAD PROTECTIVE DEVICE.
APPLICATION FILED DEC. 18, 1913.
1,136,657.
Patented Apr. 20, 1915.
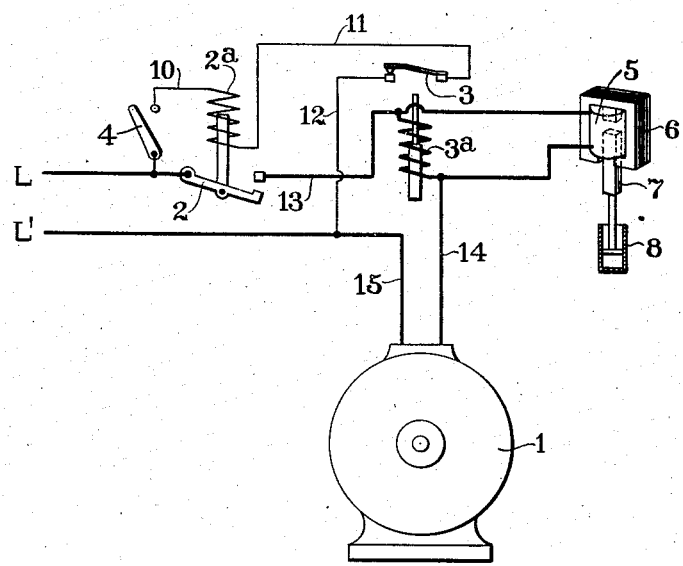

UNITED STATES PATENT OFFICE.

WILLIAM E. DATE, OF WESTFIELD, NEW JERSEY, ASSIGNOR TO THE CUTLER-HAMMER MFG. CO., OF MILWAUKEE, WISCONSIN, A CORPORATION OF WISCONSIN.

OVERLOAD PROTECTIVE DEVICE.

1,136,657. Specification of Letters Patent. Patented Apr. 20, 1915.

Application filed December 18, 1913. Serial No. 807,454.

*To all whom it may concern:*

Be it known that I, WILLIAM E. DATE, a citizen of the United States, residing at Westfield, in the county of Union and State of New Jersey, have invented new and useful Improvements in Overload Protective Devices, of which the following is a full, clear, concise, and exact description, reference being had to the accompanying drawing, forming a part of this specification.

My invention relates to overload protective devices for electric circuits and particularly electric motor circuits.

As is well understood, it is usual to allow an electric motor more current for starting than for running and thus where the motor is provided with an overload device set to protect the same in running, such device would be tripped in starting at a permissible current but for some preventive means. Various means have been proposed for this purpose, and while the same have fulfilled their function they have been found to be open to various objections including complicity of construction, etc.

This invention has among its objects to provide improved means for accomplishing the aforesaid and other results.

The more specific objects and advantages of the invention will hereinafter appear.

The accompanying drawing illustrates an embodiment of the invention applied to an alternate current motor. It should be understood, however, that certain features of the invention are applicable as well to direct current circuits and that various modifications may be made in the controller illustrated without departing from the scope of the appended claims.

Referring more specifically to the drawing, the same shows a single phase motor 1, an electro-responsive control switch 2 therefor and an overload switch 3 controlling said switch 2. The winding 2ª of the control switch 2 is connected across the supply lines L and L' through the overload switch and is controlled by a suitable manual switch 4. The winding 3ª of the overload switch is connected in series with the motor 1. The overload switch 3 is provided to protect the motor under running conditions and is adjusted to respond at a current value below that permissible in starting.

Referring now to the additional means shown, the same functions to divert from the overload winding in starting, enough of the motor current to render said winding unresponsive to the desired starting current but responsive to an excessive starting current and to thereafter automatically subject said winding to such a percentage of the motor current as to insure the desired protection in running. In practice, this means may be embodied in various different forms. As illustrated, it comprises a variable inductance shunt around the overload winding 3ª, a solenoid 5 of conventional form being employed for producing the variable inductance. The solenoid 5 has a laminated magnet frame 6 and a laminated plunger 7. Its winding is connected in parallel with the overloading winding 3ª, whereby it is deënergized when the motor circuit is opened and is energized to raise its plunger when the motor circuit is closed. As is well understood, the inductance of a solenoid is at its minimum when its plunger is in released position and is gradually increased as its plunger is attracted. Hence, when the motor circuit is initially closed, the inductance of the shunt around the overload winding is at its minimum and the current diverted thereby at its maximum, whereas when the solenoid draws in its core it increases the inductance of said shunt, thereby forcing more of the motor current through said overload winding. The overload switch may thus be readily insured against responding at safe starting current values until the solenoid 5 attracts its plunger to any predetermined extent, and if desired an increased starting period may be provided for by retarding the attraction of the solenoid plunger by a dash-pot 8 or other suitable means. On the other hand, the overload device is available to protect the motor against excessive surges of current in starting.

As will now be obvious, the operation is as follows: Switch 4 when closed completes circuit from line L by conductor 10 through the winding 2ª, by conductor 11 through the overload switch 3, by conductor 12 to line L'. This energizes switch 2 which responds and completes the motor circuit from line L by conductor 13 through the overload winding 3ª and solenoid winding 5 in parallel, by conductor 14 through the motor, by conductor 15 to line L'. The motor is thus started and the solenoid 5 energized to draw up its core against the action of the dash-pot 8. The motor accelerates during the operation of the solenoid and when the solenoid operates to a predetermined degree the overload switch is rendered responsive for running protection. If the overload switch responds, it opens the energizing circuit of the switch 2, causing the same to drop out and disconnect the motor from circuit.

What I claim as new and desire to secure by Letters Patent is:

1. In combination, a load circuit, an overload protective device therefor, and automatic means subjecting the winding of said overload device to different percentages of the current of said circuit.

2. In combination, a load circuit, an overload protective device therefor, the winding of said overload device receiving a limited percentage of the load current upon closure of said circuit, and means operating upon closure of said circuit to increase the percentage of load current received by said winding.

3. In combination, a load circuit, an overload protective device therefor, the winding of said overload device receiving a limited percentage of the load current upon closure of said circuit, and means operating upon closure of said circuit to increase the percentage of load current received by said winding, said means having a definite time element.

4. In combination, a load circuit, an overload protective device therefor having a winding in series therewith, and means acting upon closure of said circuit to divert a portion of the load current from said winding and thereafter automatically decreasing in effectiveness.

5. In combination, a load circuit, an overload protective device therefor having a winding in series therewith, a shunt around said winding to divert a part of the load current therefrom, and automatic means for varying the effectiveness of said shunt following the closure of said load circuit.

6. In combination, a load circuit, an overload protective device therefor having a winding connected in series therewith, a permanent shunt for said winding, and automatic means controlling the effectiveness of said shunt and operating upon closure of said load circuit to decrease the effectiveness thereof.

7. In combination, a load circuit, an overload protective device therefor having a winding connected in series therewith, a permanent shunt for said winding, and automatic means controlling the effectiveness of said shunt and operating upon closure of said load circuit to decrease the effectiveness thereof, said means having a definite time element.

8. In combination, an alternating current load circuit, a protective device therefor having a winding in series therewith and a variable inductance shunt for said winding.

9. In combination, an alternating current load circuit, a protective device therefor having a winding in series therewith, an inductance shunt for said winding, and means for automatically varying the inductance of said shunt, following the closure of said load circuit.

10. In combination, an alternating current load circuit, a protective device having a winding in series therewith, an inductance shunt for said winding, and means operating upon completion of said circuit to decrease the inductance of said shunt.

11. In combination, an alternating current load circuit, a protective device having a winding in series therewith, an inductance shunt for said winding, and means operating upon completion of said circuit to decrease the inductance of said shunt, said means having a definite time element.

12. In combination, an alternating current load circuit, a protective device therefor having a winding in series therewith and an automatic inductance varying device associated with said winding to vary the sensitiveness of said protective device to current variations in said load circuit for a temporary period following the closure of said circuit.

13. In combination, an alternating current load circuit, an overload protective device therefor having a winding in series therewith, and an inductive winding connected in parallel with said former winding and having a movable core for varying its inductance.

14. In combination, an alternating current load circuit, an overload protective device therefor having a winding in series therewith, and an inductive solenoid connected in parallel with said winding and having a movable plunger and retarding means therefor.

In witness whereof, I have hereunto subscribed my name in the presence of two witnesses.

WILLIAM E. DATE.

Witnesses:
C. B. STEVENS,
LAURA E. SMITH.